US007567519B1

(12) United States Patent  
Daniel

(10) Patent No.: US 7,567,519 B1
(45) Date of Patent: Jul. 28, 2009

(54) REMOTE TESTING AND MONITORING TO A CELL SITE IN A CELLULAR COMMUNICATIONS NETWORK

(75) Inventor: J. Scott Daniel, Lawrenceville, GA (US)

(73) Assignee: AT&T Intellectual Property, I, L.P., Wilmington, DE (US)

( * ) Notice: Subject to any disclaimer, the term of this patent is extended or adjusted under 35 U.S.C. 154(b) by 957 days.

(21) Appl. No.: 10/049,091

(22) PCT Filed: Jul. 24, 2000

(86) PCT No.: PCT/US00/40473

§ 371 (c)(1),
(2), (4) Date: Sep. 23, 2002

(87) PCT Pub. No.: WO01/11901

PCT Pub. Date: Feb. 15, 2001

(51) Int. Cl.
H04L 12/28 (2006.01)

(52) U.S. Cl. .................... 370/251; 370/228; 455/67.11; 455/423

(58) Field of Classification Search ......... 370/241–254, 370/217–228; 455/423, 67.11, 67.14; 379/9, 379/10.2, 10.3, 24, 32.01
See application file for complete search history.

(56) References Cited

U.S. PATENT DOCUMENTS

| 5,285,494 A | 2/1994 | Sprecher et al. |
| 5,506,956 A | 4/1996 | Cohen |
| 5,553,056 A | 9/1996 | Bronte et al. |
| 5,566,161 A | 10/1996 | Hartmann et al. |
| 5,566,162 A | 10/1996 | Gruber et al. |
| 5,608,720 A | 3/1997 | Biegel et al. |
| 5,661,778 A | 8/1997 | Hall et al. |
| 5,668,800 A | 9/1997 | Stevenson |
| 5,673,255 A * | 9/1997 | Dunn et al. .................. 370/244 |
| 5,764,726 A | 6/1998 | Selig et al. |
| 5,768,255 A | 6/1998 | Brownmiller et al. |
| 5,768,261 A | 6/1998 | Brownmiller et al. |
| 5,784,558 A | 7/1998 | Emerson et al. |
| 5,796,723 A | 8/1998 | Bencheck et al. |

(Continued)

OTHER PUBLICATIONS

Jelena Vucetic, Paul Kline, "Signal Monitoring System For Wireless Network Operation And Management", pp. 296-300, IEEE, 1998.*
Ganev, T et al, "The Ericsson DXX Cross-Connect System in Mobile Networks", Ericsson Review, 1996, pp. 75-88.*
Dailey, T., "Managing Multiple-Vendor Communications Networks," Mobile Radio Technology, 13(3), Mar. 1995, pp. 26, 28, 30, 32, 34.
Ganev, T. et al., "The Ericsson DXX Cross-Connect System in Mobile Networks," Ericsson Review, 73(2), 1996, pp. 75-88.
CrossPATHTM II Triple T1 Intelligent CSU User's Guide, Part # 1046798, May 1999, Issue 1, ADC Kentrox.

Primary Examiner—Aung S Moe
Assistant Examiner—Habte Mered
(74) Attorney, Agent, or Firm—Cantor Colburn LLP

(57) ABSTRACT

Systems and methods provide remote performance monitoring and testing to a cell site in a cellular communications network. The systems and methods include a network management center having remote monitoring and testing capabilities utilizing an intelligent customer service unit that traps and makes available alarm information on the transport link.

22 Claims, 4 Drawing Sheets

U.S. PATENT DOCUMENTS

| | | |
|---|---|---|
| 5,805,571 A | 9/1998 | Zwan et al. |
| 5,872,912 A | 2/1999 | Brownmiller et al. |
| 5,889,954 A | 3/1999 | Gessel et al. |
| 5,913,036 A | 6/1999 | Brownmiller et al. |
| 5,940,374 A | 8/1999 | Mack et al. |
| 5,956,324 A | 9/1999 | Engdahl et al. |
| 5,956,343 A * | 9/1999 | Cornes et al. ............... 370/437 |
| 6,009,079 A | 12/1999 | Boye et al. |
| 6,018,625 A * | 1/2000 | Hayball et al. ................ 703/22 |
| 6,058,120 A * | 5/2000 | Sabzevari .................... 370/466 |
| 6,091,712 A | 7/2000 | Pope et al. |
| 6,122,527 A * | 9/2000 | Robinson et al. ............ 455/557 |
| 6,282,189 B1 | 8/2001 | Eames |
| 6,351,452 B1 | 2/2002 | Koenig et al. |
| 6,678,282 B2 * | 1/2004 | Sharper et al. .............. 370/442 |
| 2001/0037395 A1 * | 11/2001 | Sabat et al. ................. 709/229 |

* cited by examiner

REMOTE TESTING AND MONITORING TO A CELL SITE IN A CELLULAR COMMUNICATIONS NETWORK

FIELD OF THE INVENTION

This invention relates generally to remote testing and monitoring in a telecommunications network and, more particularly, to systems and methods for remote testing and performance in a wireless network to a cell site.

BACKGROUND OF THE INVENTION

Wireless communications services have grown in popularity in recent years. The demand for services such as paging, cellular, personal communications services and mobile radio, has increased and customers expect high quality, low cost service. Many telecommunications providers are transitioning from the well-established analog cellular service to digital cellular service where more features and services are possible. For example, currently the majority of wireless traffic is voice traffic but in the near future the telecommunications companies predict that digital service demands will exceed requirements for voice service.

Cellular telephone networks typically involve numerous service providers and equipment. For instance, a local telephone company may manage the service from a cell site to a switch where a long distance provider switches the call throughout its network to call completion. Alternatively, one company can provide end to end service. Or a combination occurs where a local company takes the call from the cell site to locations within its local territory and to a long distance provider who switches the call across the country. Potentially, a multitude of service providers can be involved as voice and data communications traffic travels from end to end. As the number of providers increases, sources of potential problems grows requiring effective, efficient trouble isolation for problem resolution.

While the reliability of wireless communications networks has increased, often, cell sites stop working. Determining where the problems reside is challenging because communications networks include numerous components, such as, cell site equipment, central office equipment, and facilities, all which can be provided by different service providers.

One method for clearing troubles is to utilize a central network management center with remote access to certain portions of the network. The network management center checks a portion of the network. Either the network management center personnel clear the trouble remotely or they dispatch a technician to the troubled location to clear the problem. Technicians provide hands on support for both installation and maintenance of the communications network. The technician must drive to the cell site location, determine the problem and correct the problem. To determine what portion of the network is in trouble, the technician must eliminate a multitude of problems, for instance, a down telephone link to the cell site, broken cell site equipment, damage to the cell site caused by lightening, or conclude that the problem is somewhere else in the network. Cell sites can be geographically dispersed, perhaps remotely located, such as in a wooded area, requiring a technician to drive several hours just to reach the cell site. Thus, isolating a problem is a long arduous process.

In the current environment, historical performance data of the transport link to the cell site can be provided, however, real time information cannot be provided. Thus, a technician may arrive at the trouble location only to find that no trouble exists because, for instance, the trouble became clear in the time it took for the technician to arrive, the problem was not isolated to the correct piece of equipment, or the facility works properly from the technician's location towards the central office and the problem exists in a another portion of the network.

Solving these problems requires coordination among numerous people including: local carriers, long distance carriers, independent carriers, and equipment vendors. One call could involve as many as forty different carriers, making coordination between carriers a time consuming and challenging task. Customer satisfaction suffers when technicians or network management center personnel cannot correctly identify the problem or when the problem cannot be timely resolved due to coordination problems among the various suppliers. Customer satisfaction also suffers when the problem "came clear" since the customer may not be satisfied that the problem will not occur again. Solving problems is exacerbated when a cellular network contains thousands of cell sites, each of which could at some point have trouble requiring technician dispatch to resolve.

Several types of wireless communications services exist, such as the North American Global System for Mobile Communications (GSM) cellular communications networks, code division multiple access (CDMA) and time division multiple access (TDMA) networks. Each network typically includes a cell site having a tower and associated equipment, a customer service unit (CSU), transport links, central office equipment, and facilities connecting the transport link to a switch. Currently, central office or network management center personnel cannot remotely test the transport link in real time all the way to the cell site. Most failures in a cellular network occur between the transport links connecting the cell site to the switch, where real time remote testing is unavailable. Only historical (e.g., past) data on a circuit performance is available. Thus, no effective real time system or method exists for remote testing or performance monitoring of the transport links connecting cellular sites to a switch. Remote testing personnel and other maintenance personnel cannot "see" what is happening beyond channels in a digital access and cross connect system (DACS) in the central office. If the location where the trouble occurred cannot be identified, repairing the problem is more challenging. Thus, preventative testing or performance monitoring of any transport links must be performed by local field technicians utilizing performance reports with only historical data derived from an operations management center. The operations management center using the historical data produce historical transmission statistics that then can be reviewed manually to gain some insight into the health of the transport links. Resource and technological constraints currently prevent any effective proactive, real time circuit monitoring and maintenance.

As the cellular transport network becomes larger and more complex, insuring transport link quality becomes a greater challenge. Without the capability of robust remote testing, monitoring and analytical systems, the network is subject to less than optimal transport link quality, a greater number of field technicians are needed to handle transport link problems, and transport link maintenance suffers as a result of field technicians working priority outages.

Due to bandwidth limitations and limitations in the existing CSU, network performance monitoring has not reached the cell site. As a result, existing network monitoring configurations stop at the transport hub where some piece of edge transmission equipment resides.

Thus, this invention addresses the problems in the prior art and provides systems and methods for remote testing and performance monitoring of a cellular communications network that brings transmission surveillance to the cell site.

SUMMARY OF THE INVENTION

This invention includes systems and methods for providing remote performance monitoring and testing to a cell site in a cellular communications network. The systems and methods include a network management center having remote monitoring and testing capabilities utilizing an intelligent customer service unit at the cell site and working in cooperation with a communication link having a spare channel for use as a management channel. The network management center has monitoring and testing capabilities for remotely accessing the management channel. The intelligent CSU captures information on the management channel and sends an alarm when quality thresholds are not met. Moreover, network management personnel can poll the intelligent CSU to gain real time performance information on the management channel. Thus, the features of this invention include the following:

To provide a system that improves productivity for network personnel by eliminating the guesswork in finding and isolating network problems, thus reducing unnecessary dispatch of technicians and reducing the mean time to repair.

To provide a system that improves productivity for a network management center by allowing technicians to instantly focus on resolving network problems rather than deciphering the network configuration.

To provide a system that reduces overtime call outs by enabling the network management center to remotely perform network testing and monitoring.

To provide a system that reduces the number of network outages by predicting, identifying and fixing network problems before they occur thereby improving customer satisfaction.

To provide a system and method that improves network quality by providing a remote, non-intrusive method of identifying and isolating intermittent problems.

To provide a tool for tracking continued improvement initiatives with suppliers by allowing a comparison of supplier network performance, supplier trend analysis, and identifying suppliers' worst circuit segments.

Other features and advantages of this invention will be set forth in part in the description which follows and in part will be obvious from the description or may be learned by practice of the invention. The features and advantages of this invention will be realized and attained by means of the elements and combinations particularly pointed out in the claims.

DETAILED DESCRIPTION OF THE INVENTION

Reference will now be made in detail to preferred embodiments of the invention, examples of which are illustrated in the accompanying drawings.

Figure 1:
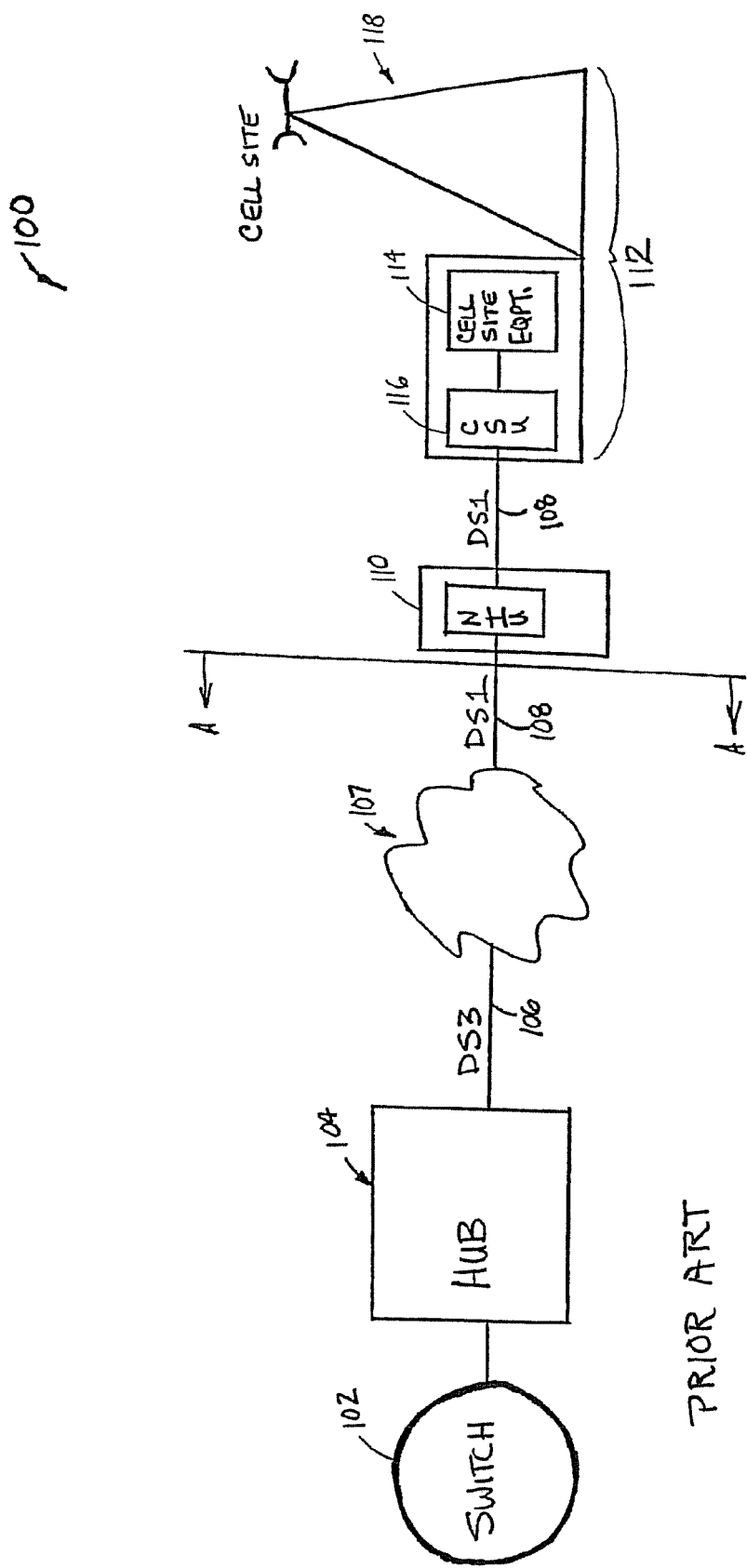
FIG. 1 shows a traditional cellular communications network without capabilities for testing and monitoring transport links to the cell site.

FIG. 1 shows a traditional cellular communications network 100. The cellular communications network 100 includes switches 102 that communicates with other switches located throughout the communications network 100, and a hub 104 having equipment adapted to communicate with the switch 102. Multiple switches 102 and hubs 104 exist throughout the network. A variety of network providers, such as, local telephone companies, long distance telephone companies and independent telephone companies can supply parts of the cellular network. A digital service, level 3 (DS3), also referred to as a T3, outputs 106 from the hub 104 and provides 28 1.544 Mbps circuits. A local network 107 translates the DS3 to a digital service, level 1 (DS1) channel 108 of 1.544 Mbps. The DS1 channel 108 couples to a Network Interface Unit (NIU) 110. The NIU 110 is positioned between the local network 107 and a cell site 112 or customer premise. The NIU 110 serves to interface and isolate the network from cell site equipment 114. The DS1 channel 108 enters a Customer Service Unit (CSU) 116. The CSU 116 is located in a cabinet at the cell site 112 along with associated cell site equipment 114. A tower 118 receives communications from and passes detected communications to the cell site equipment 114 and CSU 116. CSUs 116 are prescribed by the Federal Communications Commission (FCC) and serve several functions. The CSU 116 is an interface point for the local telephone company (Telco) and isolates Telco equipment from the network carrier's equipment. By providing electrical isolation from the carrier's circuit, the CSU 116 functions similar to a surge protector. CSUs 116 also provide bit stuffing to ensure synchronization and ones density. Additionally, CSUs 116 provide signal amplification when necessary and keeps some signals alive if the network goes down.

Traditionally, cellular communications networks cannot efficiently, effectively and in real time provide remote testing and monitoring to the cell site. Real time remote testing in the cellular communications network of FIG. 1 stops at the NIU 110, shown as line A-A in FIG. 1. Historical network performance data can be obtained by hub 104 personnel who later perform analysis and trending of the data.

Figure 2:
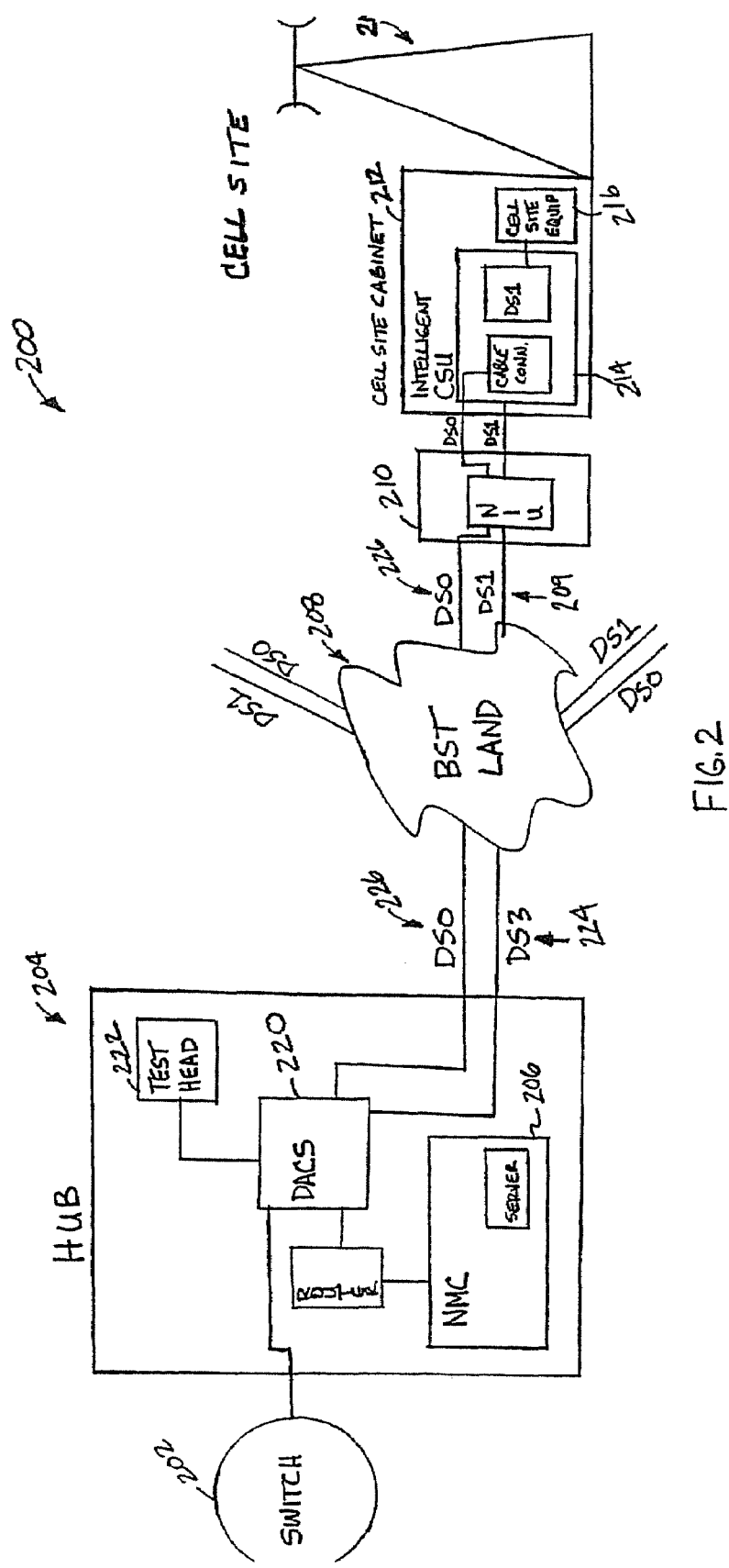
FIG. 2 shows a flow diagram of a cellular communications network according to a preferred embodiment of the invention having capabilities to remotely test and monitor transport links through the network to the cell site.

FIG. 2 shows a diagram of a cellular communications network 200 according to a preferred embodiment of this invention having capabilities to remotely test and monitor the transport links to a cell site. The network 200 includes a switch 202, a hub 204 including a network management center 206, a land network which is preferably a BellSouth land network (BST land) 208, a NIU 210, a cell site cabinet 212 enclosing an intelligent CSU 214 and cell site equipment 216, and a tower 218. An intelligent CSU 214 manufactured by ADC Kentrox of Portland, Oreg. on behalf of BellSouth Cellular Corporation is suitable for this invention. For simplicity, only one switch 202 is shown, however, multiple switches handling many calls can be switched through the hub 204. The switch 202 connects the call through the network 200, and potentially other networks to the called destination.

A digital access and cross-connect system (DACS) 220 serves to route and switch digital service lines including DS1 and DS0 lines among multiple T1 ports of the DACS 220. Calls from the switch 202 enter the hub 204 and eventually couple to the DACS 220. The DACS 220 serves more as a multiplexor than a switch. Traditional network supervision stops at the switch 202 side of the DACS 220. Network supervision involves detecting when calls complete and terminate so that billing can be determined. While the DACS 220 has quality indicators and can be polled, the DACS 220 cannot establish software traps to capture network performance data based upon quality thresholds.

The NMC 206 has capabilities to access the DACS 220 to test and monitor channels from the DACS 220 looking towards the cell site and looking towards the switch 202. A test head 222 coupled to the DACS 220 performs remote T1 testing utilizing remote testing software. TTH Corporation of Germantown, Md. makes a test head model 650S that is suitable for this invention.

Preferably, the cellular communications network is a North American Global System for Mobile Communications (GSM) network, however TDMA and CDMA networks are encompassed by this invention and provide networks compatible with this invention. The North American GSM network topology contains spare bandwidth that is utilized in this invention. The GSM configuration leaves several timeslots, (i.e. spare bandwidth) vacant that can allow for surveillance all the way to the cell site. For instance, up to three spare DS0 channels 226 per DS1 channel 209 are available. Thus, because the GSM communications network leaves several time slots vacate to the cell site utilizing an intelligent CSU 214 at the cell site, the invention extends network supervision to the cell site, allowing remote performance monitoring. Further, utilizing the intelligent CSU 214 in cooperation with DACS 220 provides for intercepting the spare bandwidth and utilizing it for testing and monitoring purposes.

This invention utilizes the spare DS0 channels 226 and configures the intelligent CSU 214 to use the spare DS0 channels 226 for network performance testing and monitoring. Both the DS1 209 and DS0 226 channels are in communication with the intelligent CSU 214. DS3 channels 224 and the spare DS0 channels 226 from the DACS 220 couple to the BST land 208 network. Customer traffic is on the DS1 channel 209. The spare DS0 channels 226 is utilized to return alarms from the intelligent CSU 214 back to the hub 204 without interrupting customer traffic on the DS1 channel 209. Thus the DS0 channel 226 is also referred to as the management channel. The intelligent CSU 214 communicates alarm data over the management channel 226. In one embodiment, the BST land 208 is a wireline network from the hub 204 to the NIU 210. The NIU 210 serves to protect the cell site and customer equipment from big surges by isolating the customer equipment and cell site from the network. An output of the BST land 208 are DS1 channels 209 and the spare DS0 channels 226. Because one DS3 channel 224 equates to three DS1 channels 209, other DS1 channels 209 and DS0 channels 226 from their associated NIUs interface and cell sites couple to the BST land 208 and connect to the hub 204. Each cell site must be customized so that the cell site equipment 216 and hub equipment 204 are configured to recognize which of the three spare DS0 channels 226 among the three spare DS0 channels 226 is utilized as the management channel. The test head 222 coupled to the DACS 220 allows NMC personnel to test a circuit, i.e. the DS0 channel 226, made available by the DACS 220.

The intelligent CSU 214 of this invention provides all of the capabilities of the CSU 116 of FIG. 1, plus provides remote transmission monitoring and testing. The intelligent CSU 214 includes an internet protocol (IP) software trap that provides an immediate warning of signal degradation without waiting on a polling cycle. A number of quality indicators alert NMC personnel to potential network problems. A sample of quality indicators that can be monitored includes: severe errored seconds (SES), errored seconds (ES), alarm indication signal (AIS), yellow alarms, extended super frame errors, out of frame errors, loss of frame errors, loss of signal errors, slip errors, cyclic redundancy check (CRC) and bipolar violations. Thresholds for each quality indicator can be set and trapped by the intelligent CSU 214. These thresholds also include timing characteristics for measuring errors and deactivation of alarms.

The intelligent CSU 214 contains configurable alarms that trigger when certain thresholds are met. Alarms can be triggered by an error occurrence on the input signal. Cell site equipment configures to match a data port configuration of the intelligent CSU 214. When an out of range occurrence transpires, the intelligent CSU 214 alarms and outputs the trapped data. The IP traps utilize a TCP/IP network by requiring a destination IP address for sending the trapped data. The IP address is typically a 32 bit address, used in IP routing which includes a network portion and a host portion. The data transmits over the management channel to the destination IP address. Alarms allow the NMC personnel to monitor the management channel for errors and take corrective action. This feature prevents interruption or deterioration of a customer's service since problems can be corrected prior to a customer's service being affected. The intelligent CSU 214 collects error messages and sends a message back through the network to the NMC personnel who take appropriate action. If the condition that triggered the alarm goes away the thresholds are reset. Optionally, network management personnel remotely reset threshold levels.

NMC personnel gain access to the real-time data of the intelligent CSU 214 via Telnet. Telnet is a TCP/IP protocol having terminal emulation that allows remote connections to other computers. Thus. NMC personnel can access the intelligent CSU 214 utilizing Telnet and work from the NMC as if their terminals were directly connected to the intelligent CSU 214. The intelligent CSU 214 configures to operate with the TCP/IP networks utilizing the IP address for the network. This arrangement provides the NMC personnel real time access to the management channel 226, performance data and alarm data.

For instance, once a quality threshold has been crossed, NMC personnel test the DS0 channel 226 in real time, or poll the intelligent CSU 214 for the last 24 hours worth of data for analysis and trending. Historical and real time statistics can be compiled utilizing the intelligent CSU 214. NMC personnel can perform loop back tests utilizing the intelligent CSU 214. Loop back tests involve testing a line by sending a signal to a remote piece of equipment and analyzing the returned signal for errors. With the intelligent CSU 214, NMC personnel can use the management channel 226 to perform loop back tests without interfering with a customer's service. Further the data can indicate that the cell site is not receiving the circuit properly from another carrier and so that carrier is called. Thus, this invention provides a diagnostic tool that reduces trouble isolation time.

Moreover, the intelligent CSU 214 provides endpoint visibility and gives the system supervision and testability through an entire drop and insert chain. The drop and insert chain includes locations where a portion of a channel such as data of a DS1 or T1, are "dropped off" to a digital device. The multiplexing device then "stuffs" bits into the channels dropped off to the data devices and sends a complete or full T1 including the bit stuffed channels to the multiplexing equipment. Further the intelligent CSU 214 contains a polling algorithm allowing polling of the spare DS0 channel 226 performance indicators. Clear Communications of Lincolnshire, Ill. provides software called Clearview suitable for polling the network. The real time reporting capability of the invention reduces the necessity of polling however, the option of polling exists.

Currently, most traffic sent over a cellular network is voice traffic. Over time, data traffic will become more prevalent. Frame relay switching techniques provide one mode of managing data traffic. Frame relay is a network shared by multiple users, built by local and long distance network providers that performs like a private network. Frame relay networks can switch small packets of bursty data over a wide area network. A data link connection identifier (DLCI) provides a destination for alarm data trapped by the intelligent CSU 214 sent out of a frame relay network. Traffic transported utilizing frame relay and other network equipment located in the hubs 204, couples to access lines that provide access from a user's equipment, such as cell site equipment, to the frame relay network. Access lines can be T1 or T3 for instance, and thus can be switched through a DACS 220. At this point, the traffic can be transported through to the cell site where the traffic can be monitored by the intelligent CSU 214.

Alternatively, an Asynchronous Transfer Mode (ATM) system switches the traffic. ATM provides for high speed, high bandwidth, packet type switching and multiplexing of traffic, including data, voice, video and multimedia images. ATM's switch data in discrete cells that are fixed in size, and asynchronously switched in hardware. However, an ATM system can be scaled down to speeds of 56 kbps and thus, DS3, DS1 and DS0 traffic can be switched through the DACS 220 through the network to a cell site. Performance monitoring and testing are possible using the intelligent CSU 214 and DS0 circuit of an ATM. Framing formats configure to match the framing format for the intelligent CSU 214. Quality indicators such as frame bit errors threshold levels are set in the intelligent CSU 214. The thresholds for ATM quality indicators can be set to measure for instance, the number of packets discarded and the number of packets delayed.

Figure 3:
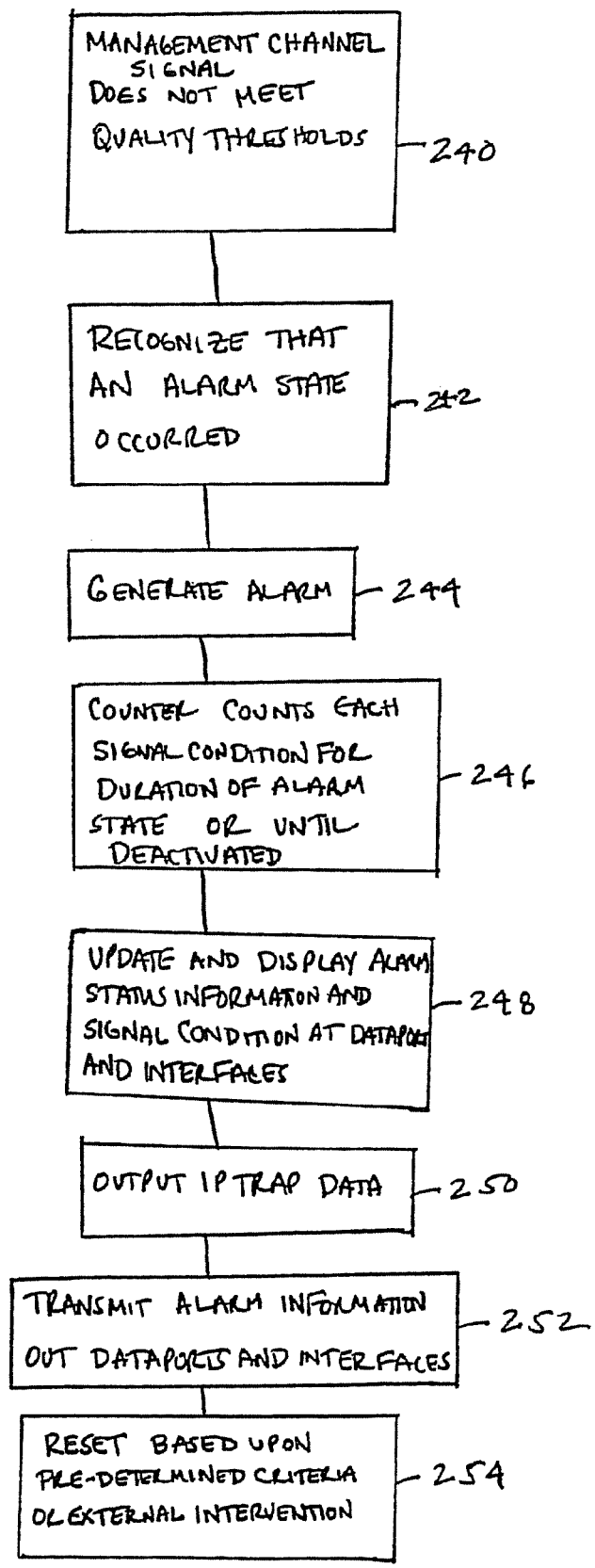
FIG. 3 shows a flow chart of the main processes performed by the intelligent CSU according to a preferred embodiment of the invention.

FIG. 3 shows a flow chart of preferred main processes performed by the intelligent CSU. At 240, the intelligent CSU 214 recognizes that the signal on the management channel 226 does not meet the quality thresholds established by the quality indicators. At 242, the intelligent CSU 214 recognizes that an alarm state has occurred. The intelligent CSU 214 generates an alarm, at 244. At 246, a counter in the memory of the intelligent CSU 214 counts each signal condition that does not meet threshold levels for the duration of the alarm state or until the alarm state is deactivated. Updating and displaying the status information and signal condition occurs at 248 and this information is placed at the data port and interfaces to cell site equipment, and the network interface. At 250, the IP trap data is output and transmitted out of data ports and interfaces at 252. At 254 the intelligent CSU is reset based on pre-determined criteria or as a result of external intervention, for instance reset by NMC personnel.

Figure 4:
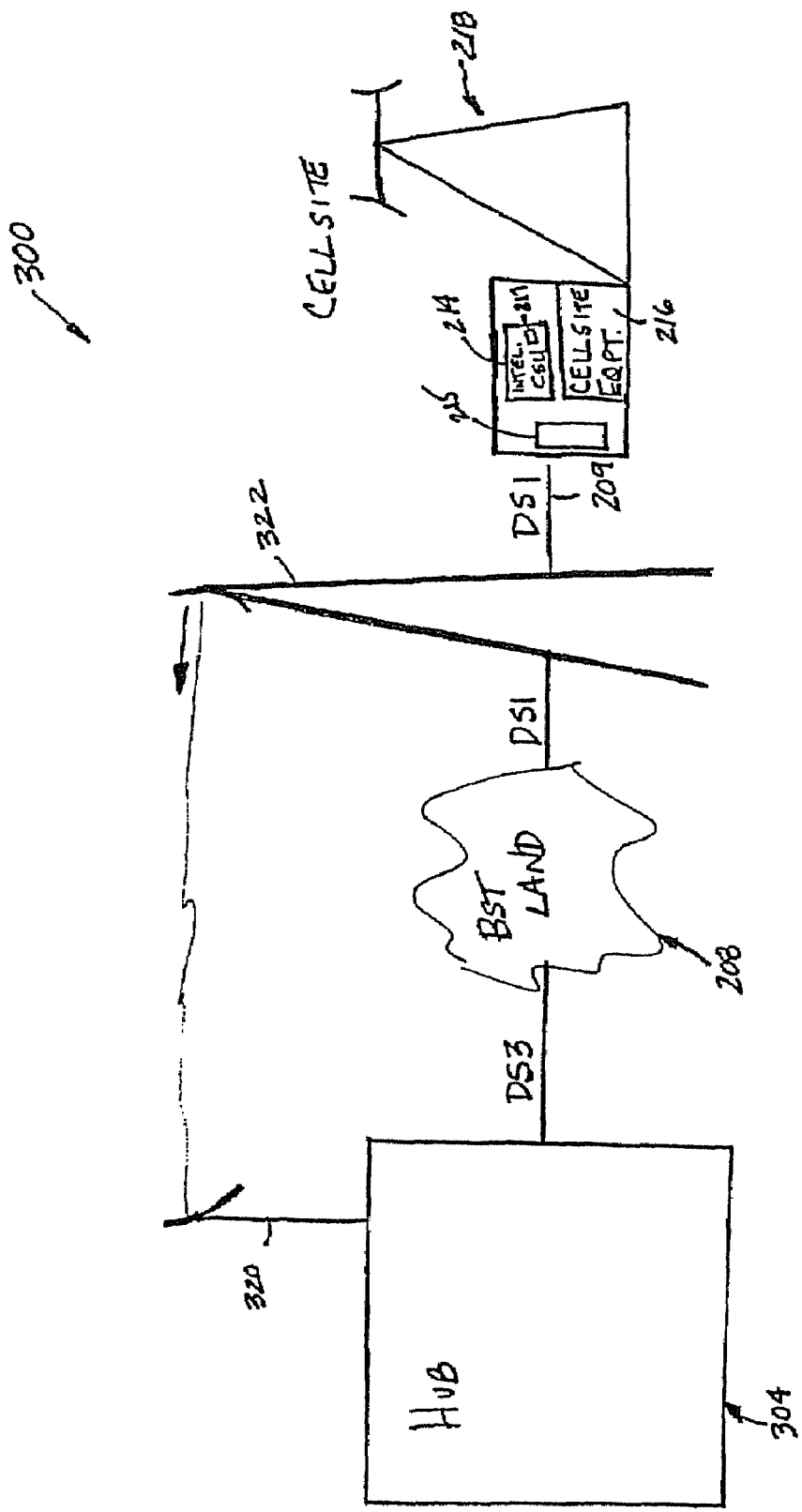
FIG. 4 shows an alternative embodiment of a system for remotely testing and monitoring transport links to a cell site.

FIG. 4 shows another alternative embodiment of a network 300 for providing remote personnel access to a cell site. In an alternative embodiment where no spare DS0 channels exists, remote testing and monitoring is providing utilizing a spare data port of the intelligent CSU 214. A wireless transceiver, such as a modem, 215 is added at the cell site and adapted to communicate with the spare data port 217. Remote personnel such as NMC personnel can call the cell site tower using the wireless transceiver 215. This arrangement allows the remote personnel to access the CSU to "look" at the circuit from the cell site through the network. A tower 320 is placed on a hub. Another tower 322 is placed between the BST land 208 and the intelligent CSU 214. A DS1 channel 209, or management channels from the hub 304 comes into the intelligent CSU 214 bringing the alarms. A wireless transceiver 215 in communication with a data port 217 in the intelligent CSU 214 communicates performance data to the tower 322. The towers 320 and 322 are utilized to send the signals back over the management channel 209 when remote personnel perform testing loopbacks. The loop backs are performed without interrupting customer service on the land based DS1. This network 300 is more costly and less efficient than network 200 due to the required towers 320, 322 and equipment, and because this embodiment utilizes a DS1 channel 209 instead of a DS0 channel 226 as the management channel.

An advantage of this invention is that it provides remote personnel capabilities to remotely test transport links to a cell site utilizing an intelligent CSU. By some estimates, ninety percent of failures in a wireless network occur between the BST land and the CSU and only ten percent occur between the hub and the switch. Thus, providing a diagnostic tool giving access and monitoring capabilities to the NMC personnel through to the CSU can drastically improve transport link performance.

Another advantage of this invention is that the NMC personnel can isolate network troubles without the aid of field personnel.

Still another advantage of this invention is that the NMC personnel can monitor and test any circuit for any reason without interrupting a customer service.

Yet another advantage of this invention is that the NMC personnel have means to prevent some outages as degrading circuits are brought to their attention by this invention.

The forgoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

What is claimed is:

1. An intelligent network device to provide remote performance monitoring of a transport link between a switch and a cell site, the intelligent network device comprising:
   a first interface connecting the intelligent network device and a network management center;
   the first interface connecting the intelligent network device and the cell site;
   logic configured to communicate network management signals across at least one channel of the transport link wherein the at least one channel is a digital signal zero (DS0) management channel;
   logic configured to generate a trap as one type of network management signal responsive to the transport link not meeting at least one quality indicator;
   logic configured to recognize which of a plurality of spare DS0 channels is the DS0 management channel, the plurality of spare DS0 channels coupling the network management center and the cell site; and
   logic configured to transmit test signals on the DS0 management channel to diagnose the transport link not meeting the at least one quality indicator.

2. The intelligent network device of claim 1, wherein the at least one quality indicator comprises an indication of: severe errored seconds, errored seconds, alarm indication signal, yellow alarms, extended super frame errors, out of frame errors, loss of frame errors, loss of signal errors, slip errors, cyclic redundancy check errors, and bipolar violation errors.

3. The intelligent network device of claim 1, wherein the trap is carried in a packet of an internet protocol.

4. The intelligent network device of claim 1 further comprising logic configured to respond to a poll.

5. The intelligent network device of claim 1 further comprising logic configured to support remote terminal connection using a telnet protocol.

6. The intelligent network device of claim 1, wherein the transport link carries voice traffic.

7. The intelligent network device of claim 1, wherein the transport link carries data traffic.

8. The intelligent network device of claim 7, wherein the data traffic is transported using frame relay.

9. The intelligent network device of claim 7, wherein the data traffic is transported using asynchronous transfer mode (ATM).

10. The intelligent network device of claim 7, wherein the at least one quality indicator comprises at least one of: a number of packets discarded and a number of packets delayed.

11. The intelligent network device of claim 1, further comprising a second interface adapted to connect to a wireless modem.

12. A method for using intelligent network device to provide remote performance monitoring of a transport link between a switch and a cell site, the method comprising:
    providing a first interface to connect the intelligent network device and a network management center;
    providing the first interface to connect the intelligent network device and the cell site;
    communicating network management signals across at least one channel of the transport link, wherein the at least one channel is a digital signal zero (DS0) management channel;
    generating a trap as one type of network management signal responsive to the transport link not meeting at least one quality indicator;
    recognizing which of a plurality of spare DS0 channels is the DS0 management channel, the plurality of spare DS0 channels coupling the network management center and the cell site; and
    transmitting test signals on the DS0 management channel to diagnose the transport link not meeting the at least one quality indicator.

13. The method of claim 12, wherein the at least one quality indicator comprises an indication of: severe errored seconds, errored seconds, alarm indication signal, yellow alarms, extended super frame errors, out of frame errors, loss of frame errors, loss of signal errors, slip errors, cyclic redundancy check errors, and bipolar violation errors.

14. The method of claim 12, wherein the trap is carried in a packet of an internet protocol.

15. The method of claim 12 further comprising: responding to a poll.

16. The method of claim 12 further comprising: operating with a remote terminal connection using a telnet protocol.

17. The method of claim 12, wherein the transport link carries voice traffic.

18. The method of claim 12, wherein the transport link carries data traffic.

19. The method of claim 18, wherein the data traffic is transported using frame relay.

20. The method of claim 18, wherein the data traffic is transported using asynchronous transfer mode (ATM).

21. The method of claim 18, wherein the at least one quality indicator comprises at least one of: a number of packets discarded and a number of packets delayed.

22. The method of claim 12, further comprising: providing a third second interface adapted to connect to a wireless modem.

* * * * *